June 5, 1923.

F. E. VOORHIES

COTTON SEED LINTING MACHINE

Filed June 25, 1921

1,457,329

Inventor
Felix E. Voorhies
By Attorney
James C. Ledbetter

Patented June 5, 1923.

1,457,329

UNITED STATES PATENT OFFICE.

FELIX E. VOORHIES, OF DALLAS, TEXAS.

COTTONSEED-LINTING MACHINE.

Application filed June 25, 1921. Serial No. 480,332.

*To all whom it may concern:*

Be it known that I, FELIX E. VOORHIES, a citizen of the United States, residing at Dallas, Dallas County, Texas, have invented certain new and useful Improvements in Cottonseed-Linting Machines, of which the following is a specification.

This invention relates to cotton seed linting machines, and particularly to improvements on the linting machines shown in my former patents numbered 1308823, 1353295 and a co-pending application for patent filed April 21st, 1920, Serial Number 375,449.

The principal object in view is to make improvements in the linting mechanism or the seed and lint cutting or stripping elements so that cotton seed passed through the machine are thoroughly cleaned and stripped of lint and are bare and slick in appearance.

For a comprehensive understanding of the structure and operation of a cotton seed linting machine, reference is made to my Patent Number 1353295. In the present application, I disclose only the mechanism constituting this invention, and those conversant with the art will readily comprehend its operation when read or observed in connection with the aforesaid patent.

The accompanying drawings show the principle of my invention and an embodiment thereof; and though a preferred and practical form of construction is illustrated, I claim the right of protection as to such changes as obviously come within the scope of my invention.

Figure 1:
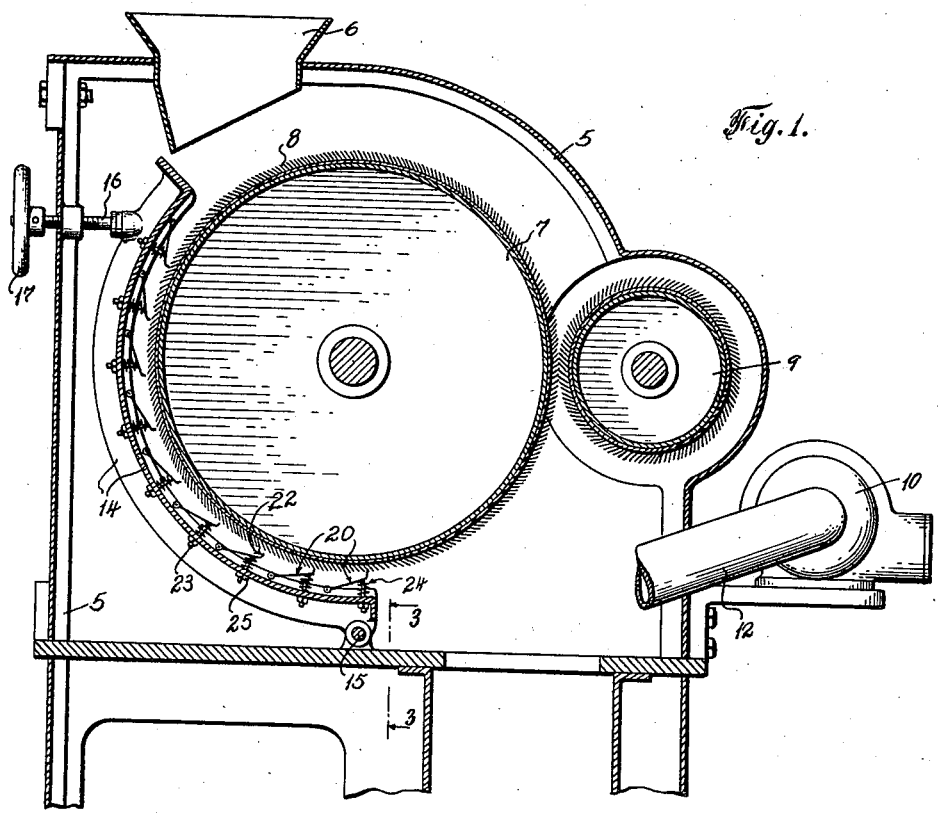
Figure 2:
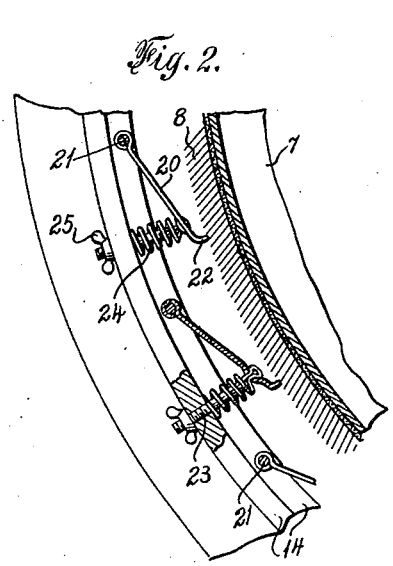
Figure 3:
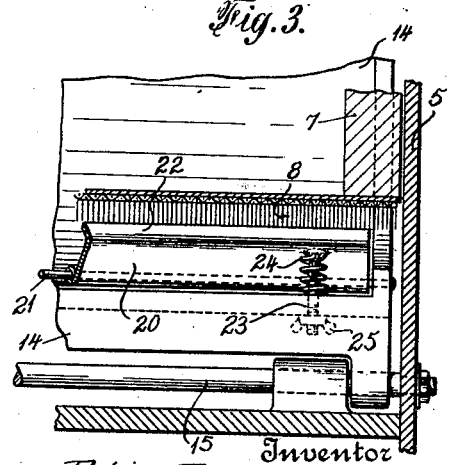

In the drawings, Figure 1 shows a longitudinal vertical sectional view through the upper part of a cotton seed linting machine with my improved lint and seed stripping mechanism embodied therein. Figure 2 shows an enlarged view of several linter blades to more clearly illustrate the construction thereof. Figure 3 illustrates a cross sectional view taken on the line 3—3 of Figure 1, and being somewhat enlarged to show the lengthwise construction of the seed stripping blades.

A cotton seed lint stripping or cutting apparatus constructed in accordance with the plans of my invention, embodies a plurality of spring supported blades working in conjunction with a rotating carder drum. Provision is made for adjusting the stripping or cutting blades to obtain the maximum output of linted seed and to secure the best cutting and cleaning requirements so that all lint may be removed from the seed with the expenditure of a minimum driving power for operating the machine.

Referring now more particularly to the drawings for a detailed description of the invention, there is shown the framework and casing 5 containing the operative parts of the machine, and in the upper portion of the casing a seed receiving spout 6 is disposed for the purpose of feeding seed to be linted into the machine. A carder drum 7 is journaled in the machine and driven by any suitable means. The periphery of the carder drum carries carder cloth 8 consisting of closely spaced short pins disposed radially or angularly on the working face of the cylinder. A doffer drum 9, constructed similarly to the drum 7, is journaled in close working relation with the periphery of the carder points 8 of the larger drum. The function of this doffer drum is to remove the small particles of lint adhering to the carder drum 7. A suction fan 10 is mounted outside the casing and a large air suction conduit 12 connects the interior of the machine with the fan. The purpose of the suction fan 10 is to continuously remove the lint from the machine as the stripping and cutting mechanism acts on the seed to loosen and remove the lint therefrom.

Having described, in general terms, the parts of a linting machine related more or less with the improvements constituting the present invention, a description will now be given of my improved lint stripping and cutting mechanism whereby a comprehensive understanding of the action of the entire apparatus will be obtained.

An arcuate framepiece, sometimes known to those conversant with the art as a linter breast, has its lower end 14 pivotally supported on a fulcrum pin 15, the upper end of which linter breast is adapted to slight movement relatively with the periphery of carder drum 7, and for this purpose a screw threaded shaft 16 is connected with the framepiece 14. A hand wheel 17 is fixed on the outer end of the shaft 16 and is so arranged that rotation of the hand wheel and shaft 16 moves the framepiece 14 closer to or farther from the carder points 8 of the drum 7.

Cutting or stripping blades 20 are constructed of light or thin gauge sheet steel and carried on the inner face of the framepiece. A plurality of these cutting blades 20 are used and may be equi-distantly spaced apart. The rear edge of each cutting blade is pivotally supported on a rod 21 which rod has its ends supported by the arcuate breast or framepiece 14. The forward or free edge of the cutting blade 20 is upturned, as shown at 22, and the outer edge of the upturned cutting or linting portion 22 is adapted to work in close relation with the ends of the carder pins 8. A screw threaded adjusting member 23 is screw threaded in the framepiece 14 back of the blade 20, and a coil spring 24 is confined on the inner end of the screw. One end of the coil spring rests against the inner face of the framepiece 14 while the outer end of the spring may rest against the back side of the cutting glade 20, or if it is preferred, the outer end of the spring may be attached to the thin blades 20 so as to secure a better supporting connection between the spring and blade. The blade has its outer free cutting edge resiliently supported on the coil spring 24 and yieldingly works against, or in close relation to the tips or points of the carder points 8.

The cutting or stripping blades 20 vary in length according to the size and capacity of the machine and it is practical to employ a supporting spring 24 and guide screw 23 at each end of the blade. The design of the blades 20 with the upturned cutting edge 22 gives a strong rigid construction so that no flexing or bending occurs in the blade itself. The tension or resistance of the spring 24 is varied by turning the nut 25 screw threaded on the outer end of the guide screw 23. In this manner the cutting efficiency of the sharp blade edges 22 is adjusted to the most favorable operating conditions, while a still further adjustment of the linting breast is obtained by the use of hand wheel 17. By appropriate adjustment of the hand wheel 17 the upper end of the linting breast is suitably adjusted to admit a quantity of seed which rapidly pass downwardly toward the lower end of the stripping breast and mechanism, but which seed are gradually impeded by the increasingly closely spaced blades on the lower part of the breast to retard the movement of the seed as the lint cutting process takes place as the seed move downwardly.

The seed are fed through the spout 6 and are rapidly carried and forced into the space between the linting breast and periphery of the carder drum 7. The lint covered seed adhere to the carder points and are forwardly forced along and against the cutting mechanism on the carder breast. The spring supported blades yield to cumulative pressure of a large quantity of seed and allow the seed to pass only to be acted and worked upon by the succeeding blades. The carder points continue to work the seed down the carder breast until they are finally driven outwardly from the last cutting blade where the seed and lint are thrown from the cylinder 7 by centrifugal force. The seed and lint are appropriately separated by suction means and seed conveying apparatus.

This improved form of cotton seed linting machine has been found to satisfactorily answer the requirements for a high speed linting machine for use in cotton gin plants and oil mills.

Having described my invention, what I claim and desire to secure by Letters Patent is:

1. A cotton seed linting machine comprising a frame support, a plurality of linting blades made of sheet metal and having one edge attached to the frame support, and the other edge turned at an angle with the blade to form a lint cutting edge, and means to force seed over the cutting edge.

2. A cotton seed linting machine of the character defined in claim 3 wherein the frame piece is provided with a device for adjusting it relatively with the means to force the seed against the blades.

3. A cotton seed linting machine comprising a frame support, a plurality of linting blades made of sheet metal and having one edge attached to the frame support, the other edge turned at an angle with the blade to form a lint cutting edge, means to force seed over the cutting edge, and an adjustment means for regulating the distance between the blades and the means.

In testimony whereof I hereunto set my hand this 21st day of May, 1921, in the city of Dallas, Dallas County, Texas.

FELIX E. VOORHIES.